United States Patent Office 3,366,543
Patented Jan. 30, 1968

3,366,543
PROCESS OF ATTENUATING INFECTIOUS
BOVINE RHINOTRACHEITIS VIRUSES
Carrell J. Kucera, Fort Dodge, Iowa, assignor to American Home Products Corporation, New York, N.Y., a corporation of Delaware
No Drawing. Filed Aug. 17, 1964, Ser. No. 390,196
3 Claims. (Cl. 167—78)

ABSTRACT OF THE DISCLOSURE

Bovine-virulent infectious bovine rhinotracheitis virus which has been passaged twice through tissue cultures of bovine kidney cells is thereafter attenuated by from about six to eighteen serial passages through tissue cultures of rabbit kidney cells; after such serial passage through rabbit cell cultures, the virus becomes incapable of causing clinical symptoms of the disease when injected intramuscularly or instilled intranasally into susceptible bovines, but does cause the development of protective antibodies which enable the vaccinated animal to withstand challenge by virulent virus without exhibiting clinical symptoms of the disease. Virus-laden tissue culture fluids may be combined with a stabilizer and lyophilized to produce a reconstitutable vaccine.

---

This invention relates to vaccines and the production of vaccines, and more particularly to a novel infectious bovine rhinotracheitis vaccine which is effective in immunizing cattle against infectious bovine rhinotracheitis, and to a method of producing such a vaccine.

Infectious bovine rhinotracheitis is a virus disease involving the respiratory tract of cattle. This disease has become recognized as widespread and a cause of great economic loss to both dairymen and beef producers, and consequently its control has become a veterinary problem of great importance. An attenuated or modified live virus vaccine would appear to offer the best hope of serving to control this disease, and the provision of a method for producing such a virus vaccine which will immunize bovines dependably without risk of provoking clinical symptoms of disease or introducing other unwanted or adventitious viruses into a herd is accordingly highly desirable.

In the past, other workers have attained a measure of success in this effort by passing bovine-virulent infectious bovine rhinotracheitis virus through a succession of canine, porcine, ovine, bovine, or human cancer tissues until modification or attenuation of the virus resulted to the extent that it no longer caused clinical symptoms of the disease while retaining its ability to stimulate production of immunizing antibodies in the blood of susceptible animals. To produce these vaccines these workers have used as many as over a hundred serial passages through tissue cultures, sometimes alternating cell species at each passage, and sometimes using one species for part of the passages and then another for the remainder.

Use of these prior art infectious bovine rhinotracheitis vaccines, however, has been attained by certain risks, disadvantages, and hazards. Outbreaks of other virus diseases have followed treatment of stock with certain of these vaccines, due, apparently to the presence of other viruses in the cell culture used. Just as monkey kidney tissue cultures now are known to be frequently contaminated with viruses highly lethal to humans, it is not uncommon to find viruses in porcine, ovine, bovine and canine tissues which can cause disease in cattle. A vaccine which induces or spreads other infection in a herd while immunizing against infectious bovine rhinotracheitis obviously falls short of being completely satisfactory.

Surprisingly, I have found that by infecting rabbit kidney cells maintained in tissue culture media with bovine-virulent infectious bovine rhinotracheitis virus and thereafter passing the virus serially through only about twelve cultures of rabbit kidney cells, I obtain a vaccine which is extremely potent in conferring immunity on susceptible bovines but which appears to be remarkably free of adventitious viruses and which causes no detectable symptoms of disease in the treated animals or in others exposed to them.

At the time of making this discovery it was highly unexpectable that this virus could be modified by passing through rabbit kidney cells since earlier workers had reported failure in attempts to infect rabbits with infectious bovine rhinotracheitis. Since commercially raised rabbits are usually relatively free of virus infections virulent in or adaptable to bovines, the use of rabbit kidney tissue in culturing infectious bovine rhinotracheitis virus results in vaccines remarkably free of adventitious and undesirable viruses.

In the propagation and attenuation of cattle-virulent infectious bovine rhinotracheitis virus, kidney cell cultures derived from the kidneys of young New Zealand White rabbits, aged six weeks to four months, are employed. The rabbit kidney cell cultures may be propagated in any of several tissue culture media, such as the following:

(1) | Percent
--- | ---
Lactalbumin hydrolyzate | 0.5
Hank's balanced salt solution | 89.5
Calf, lamb, or horse serum | 10.0

(2) | 
--- | ---
Lactalbumin hydrolyzate | 0.5
Earle's balanced salt solution | 89.5
Calf, lamb, or horse serum | 10.0

(3) | 
--- | ---
Parker's medium No. 199 | 90.0
Calf, lamb, or horse serum | 10.0

(4) | 
--- | ---
Eagle's medium | 90.0
Calf, lamb, or horse serum | 10.0

(5) | 
--- | ---
Parker's medium No. 199 | 89.5
Lactalbumin hydrolyzate | 0.5
Calf, lamb, or horse serum | 10.0

(6) | 
--- | ---
Eagle's medium | 89.5
Lactalbumin hydrolyzate | 0.5
Calf, lamb, or horse serum | 10.0

The antibiotics, penicillin G and dihydrostreptomycin, are added to contain 100 units and 100 mcgm. per ml., respectively, in the above media.

In the propagation and attenuation of cattle-virulent IBR virus in rabbit kidney cell cultures, the tissue cultures were produced in general conformity with the well-known tissue culture techniques of Dulbecco and Vogt which involve the incubation of trypsin-dispersed cells of tissues in a nutrient fluid tissue culture medium until a monolayer of tissue cells is formed. In the propagation of the virus, replacement of the nutrient fluid tissue culture medium is made with a maintenance fluid tissue culture medium which is essentially protein free.

The cattle-virulent IBR virus used by me in this invention was originally recovered from the nasal fluids of a Colorado bovine actually ill with infectious bovine rhinotracheitis. Before use in the within-described attenuation procedure it was passed twice through bovine embryonic kidney cultures. At this stage the virus was still strongly cattle-virulent and showed no signs of having been attenuated. It appears similar in all respects to the completely virulent field strains of the disease. It was stored in 5 ml. vials, frozen and kept at −70° C.

Sheets of rabbit kidney cells were prepared by growth in a number of one-liter Roux flasks, using about 75 ml. of thea bove nutrient medium No. 2 (calf serum) with antibiotics in each flask, following the well-known procedure of Dulbecco and Vogt. The used nutrient medium was then poured off and discarded. Several of the flasks were then infected by addition of 0.1 ml. of the cattle-virulent virus, while other flasks of cells were left uninoculated to serve as controls; after allowing 10 minutes for adsorption of the virus, 75 ml. of maintenance medium (consisting of 0.5% lactalbumin hydrolysate and 99.5% Earle's balanced salt solution, and containing antibiotics in the above indicated amounts) was added to each flask. After about seven days of incubation at 37° C., all the infected cell sheets showed a marked degree of cytopathic change, while the uninfected sheets remained healthy in appearance. The fluids from the infected bottles were harvested, pooled, bottled in 5 ml. amounts, and then frozen and stored at −70° C.

In a similar manner as described above a number of rapid serial passages of the IBR virus in primary rabbit kidney cell cultures were made. The time of appearance of cytopathic changes in the IBR-infected rabbit kidney cell cultures gradually was reduced from about seven days following inoculation of the cell sheets to less than two days for the 6th to 12th serial passages. This prompt appearance of cytopathic change in the host cells is strongly indicative of the adaptation of the virus to the tissue culture cells.

A sample of the virus-laden maintenance medium from the second rabbit kidney cell passage was injected into a susceptible bovine and found to be strongly virulent; the animal appeared depressed, had respiratory difficulties, had an abnormally high body temperature, and required four days to recover its normal health. A similar test on another animal with fluid from the sixth rabbit kidney cell passage indicated that considerable attenuation of the virus had taken place; the disease symptoms appeared but were less severe, and recovery was very much faster.

Virus from the 12th rabbit kidney passage was inoculated into a number of bovines which showed no detectable antibody to the IBR virus in a serum neutralization test. To this end, bovines aged six months to three years were randomized into two groups. Animals comprising the first group were injected intramuscularly with 1.0 ml. each of the above 12th passage virus. Animals of the second group were treated by having 0.5 ml. of the 12th passage virus fluid instilled into each nostril; the instilled fluids were rubbed around the nasal mucosa to assure intimate contact of the virus-laden fluid with the nasal epithelium. These test animals were then subjected to daily examination of nasal and buccal cavities and daily determinations of rectal temperatures.

The above daily examinations of these test animals continued for three weeks. At no time did any of these animals show any signs of IBR infection as indicated by an elevated temperature or by hyperemia and/or lesions of the nasal epithelium.

Blood serum samples obtined from these test cattle before and three weeks after being treated with the 12th passage virus were subjected to a serum neutralization test with an entirely different strain of known IBR virus.

Briefly, the results of the serum neutralization tests may be summarized as follows: Prior to being subjected to injection or intranasal instillation of the 12th passing virus, all of the animals were susceptible to IBR infection inasmuch as none of the animals manifested any detectable neutralizing antibody to IBR in their blood sera. Following the injection or instillation of the rabbit-adapted (12th passage) IBR virus into these animals, rather high levels of IBR antibodies were detected in all of these animals.

Following this determination that there had been a serologic conversion of these test bovines from an IBR-susceptible state to an IBR-resistant state, these animals, together with a group of IBR-susceptible bovines, were challenged uniformly by the intranasal route with a known virulent strain of IBR virus. The challenge virus titred $10^{7.2}$ $TCID_{50}$ of virus per ml., 1 ml. being given to each of the challenged animals.

Following this challenge, all the animals in the test were examined daily for signs of infection with IBR; rectal temperatures were determined, and examination of the nasal and buccal cavities were made. The animals which had received the rabbit-adapted IBR virus (12th passage) either intramuscularly or intranasally failed to show any clinical symptoms of the disease; they showed no temperature rise and no hyperemia or nasal lesions. Control animals, however, (which had not received the immunizing doses of rabbit-adapted virus) showed an abrupt rise of temperature on the third day following the intranasal challenge. Temperatures as high as 105.8° F. were noted. These control animals were depressed, showed marked hyperemia of the nostrils and manifested well-defined nasal lesions characteristics of infection with infectious bovine rhinotracheitis virus; they showed a marked mucous discharge which at times were tinged with red, and exhibited signs of respiratory difficulties as indicated by respiratory rates as high as 156 per minute. The signs of IBR infection in this challenge control group of cattle lasted from the third day following challenge to the 9th and 10th days, when their temperatures returned to normal (101–102° F.) and the respiratory rates became more normal.

Thus it was proved conclusively that the rabbit-adapted IBR virus provides complete protection of bovines against infection by virulent infectious bovine rhinotracheitis virus, without itself causing any of the familiar clinical symptoms of this disease. It is to be noted that IBR virus attenuated and propagated by repeated serial passages through bovine kidney cell tissue cultures only have been observed to cause febrile reactions of varying duration in stock treated with it; as noted above, my rabbit-adapted IBR virus has caused no clinical symptoms of disease, yet has afforded complete protection to bovines challenged by normally highly infective doses of virulent infectious bovine rhinotracheitis virus.

I have observed that after adaptation of the infectious bovine rhinotracheitis virus to growth in tissue cultured rabbit kidney cells, e.g., after about six passages through such cells, the maximum viral yield is attained approximately 60–72 hours after infection of the rabbit kidney cell sheet with the inoculating virus. The titres usually obtained are from $10^6$ to $10^7$ $TCID_{50}$ of rabbit-adapted infectious bovine rhinotracheitis virus per milliliter. The harvested fluids are pooled in 500–1000 ml. lots and the major portion of each pool is frozen at −70° C.

Sterility tests are carried out on unfrozen samples of each pool by inoculating into tubes of fluid thioglycolate medium, into tubes of tryptose phosphate broth, and onto the surface of blood agar plates. If the tests indicate sterility and the titres are between $10^6$ and $10^7$ $TCID_{50}$ per milliliter, the frozen pooled fluids are thawed, combined with a virus stabilizer, divided into convenient dosage portions, and freeze dried.

While various virus stabilizers may be used, a particularly satisfactory stabilizer for use in connection with the vaccine of this invention may be made by preparing a solution of 40 grams of gelatin in 200 milliliters of water, autoclaving at 15 pounds per square inch superatmospheric pressure for two hours, cooling to room temperature, and adding to a solution (sterilized by filtration) of 150 grams sucrose, 5.0 grams lactalbumin hydrolysate, 2.5 grams $K_2HPO_4$, 1.0 gram $HK_2PO_4$, and 0.55 grams KOH in 800 milliliters of water; this stabilizer solution has a pH of about 7.2 and is best stored at 4° C. until it is to be used. Obviously, instead of the quantities of $K_2HPO_4$, $KH_2PO_4$, and KOH above given, one can use any stoichiometrically equivalent combination of any two or more of $H_3PO_4$, $KH_2PO_4$, $K_2HPO_4$, $K_3PO_4$, and KOH. The selection of the particular agents to use can be based on convenience and availability of materials; whichever are selected, they will be used in amounts to give the same composition as in the above description. Thus a liter of stabilizer solution will contain, as a mixture of potassium phosphates, about 0.0459 mols. of potassium and about 0.0217 mols. of phosphate; this can be supplied, for example as 3.64 grams of $K_2HPO_4$ and 0.175 grams of $K_3PO_4$, and it will be obvious to any chemist that other combinations of the above-listed potassium and phosphate compounds can be used to attain identical compositions.

The stabilizer solution, containing as it does, products of the partial hydrolysis of lactalbumin and gelatin, exerts a complex buffering action; the mechanism by which it serves to protect and preserve the live virus in dried form is not understood by me, but I have found it highly effective. Minor changes can, of course, be made in the concentration of the stabilizer solution or in the ratio of the sucrose to the buffer salts without greatly altering the effectiveness of the stabilizer.

In use, one volume of stabilizer solution is mixed with from one to four volumes of virus-laden fluid, preferably from one to three volumes.

After appropriately mixing the stabilizer solution and the virus-laden fluid, sterile vaccine bottles are aseptically filled with a predetermined volume of the stabilized virus fluid. The volume of the fill of each of the bottles is dependent on the number of doses which are wanted for use in the field. Thus, a 10 dose field bottle would be filled with from 2.5 to 10.0 ml. of the stabilized, virus-laden fluid. A 20-dose field bottle would be filled with from 5.0 to 20.0 ml. of the stabilized, virus-laden fluid. The same relative proportions are used in filling the 25, 50 and 100 dose bottles.

A specially designed stopper is placed in the neck of each of the filled vaccine bottles. The loosely stoppered vaccine bottles are either frozen on the surface of Dry Ice, in a special cabinet which maintains temperatures of from −40° to −70° C. or on the refrigerated shelves of the freeze-drying chambers at temperatures of from −40° to −70° C.

After freezing the contents of the vaccine bottles, the bottles are subjected to an intense vacuum (0.5 to 50 microns of mercury) under cold conditions. The moisture is sublimed from the product and is condensed on a condensing element.

Subsequent to driving off the moisture, the stoppers in the vaccine bottles are sealed tightly in the necks of bottles by means of an internal mechanical device. This process is accomplished while the product is still under a vacuum.

In stabilized and freeze-dried form, the vaccine of this invention may be stored for long periods at ordinary room temperature, and may be reconstituted immediately before use by addition of sterile saline solution or distilled water.

Although the twelfth virus passage, as shown above, resulted in an attenuated virus vaccine which affords protection without causing any clinical symptoms of the disease, four additional passages were made through rabbit kidney cells. The resulting 16th passage virus also left bovines symptom-free while at the same time conferring immunity.

What is claimed is:

1. A process of attenuating a bovine-virulent infectious bovine rhinotracheitis virus comprising passing the virus serially at least six times through tissue cultured rabbit kidney cells.

2. The process of claim 1 in which the tissue cultured rabbit kidney cells are primary cultures.

3. A process according to claim 1 in which the virus is passed from about 12 to 16 times through primary cultures of rabbit kidney cells.

References Cited

UNITED STATES PATENTS 3,057,783  10/1962  Cabasso _____ 167—78

OTHER REFERENCES

Baker et al., Cornell Vet., vol. 48, pp. 207–213.

Chow et al., United States Livestock Sanitary Association Proceedings, vol. 58–59, pp. 168–172, 1954–1955.

LEWIS GOTTS, *Primary Examiner.*

RICHARD L. HUFF, *Examiner.*